United States Patent [19]
Doman et al.

[11] 3,768,440
[45] Oct. 30, 1973

[54] STAIN SYSTEM FOR MEMBRANE FILTERS

[75] Inventors: Patrick A. Doman, Farmington; Ronald N. Wilkie, New Baltimore, both of Mich.

[73] Assignee: Gam Rad, Incorporated, Detroit, Mich.

[22] Filed: July 25, 1972

[21] Appl. No.: 274,980

[52] U.S. Cl.............. 118/503, 29/229, 224/45 K
[51] Int. Cl............................... B05c 11/14
[58] Field of Search.................118/500–503, 118/30, 523–525; 211/41; 224/45 K; 269/321 W, 287; 40/156, 152, 153; 29/527.2, 229, 283, 278, 282, 280; 350/318, 252; 55/502, 504, 509, 507

[56] References Cited
UNITED STATES PATENTS

| | | | |
|---|---|---|---|
| 2,344,855 | 3/1944 | Dorfan | 118/501 |
| 2,522,416 | 9/1950 | Weiskopf | 118/503 |
| 2,635,784 | 4/1953 | Bering et al | 55/509 X |
| 3,362,141 | 1/1968 | Royster, Jr. et al. | 55/502 X |
| 3,461,842 | 8/1969 | Conrad et al. | 118/500 |
| 3,486,631 | 12/1969 | Rodman | 118/500 X |
| 3,543,668 | 12/1970 | Vlock | 118/500 X |

FOREIGN PATENTS OR APPLICATIONS

| | | | |
|---|---|---|---|
| 728,946 | 12/1942 | Germany | 118/503 |

*Primary Examiner*—Morris Kaplan
*Attorney*—Joseph R. Papp

[57] ABSTRACT

A stain system for staining membrane filters including a stain basket for securely holding and carrying a plurality of membrane filters each supported in a filter assembly which provides substantial circumferential support for the filters and which is of a simple two piece construction which can be easily assembled and taken apart.

14 Claims, 5 Drawing Figures

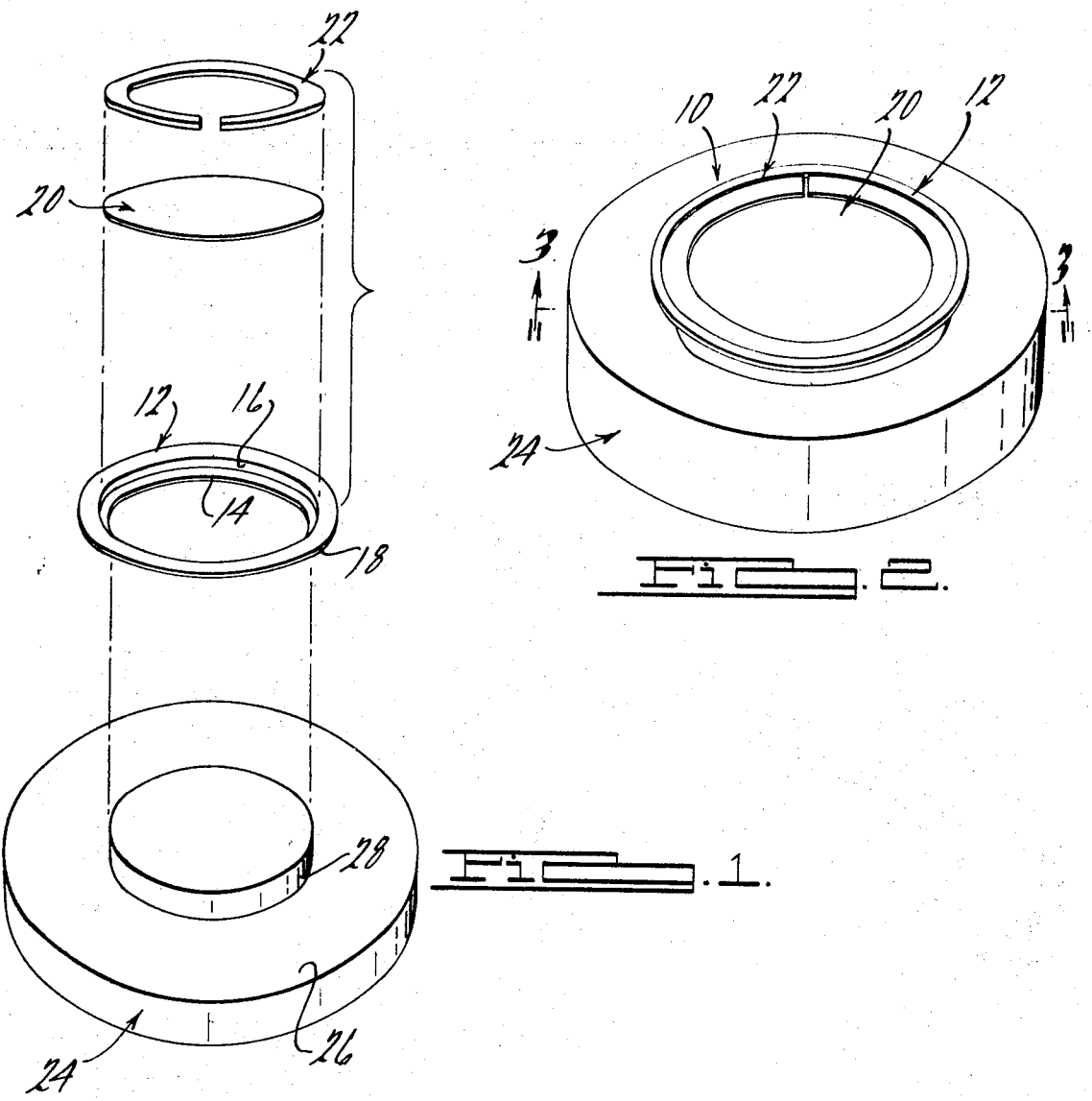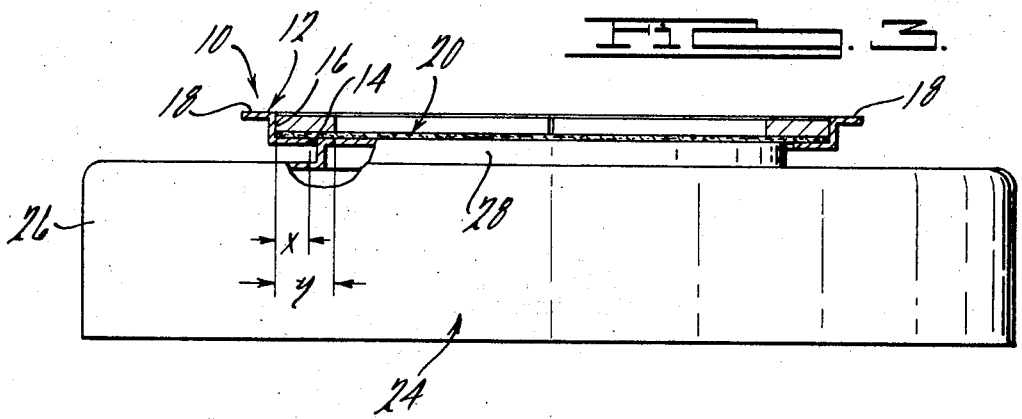

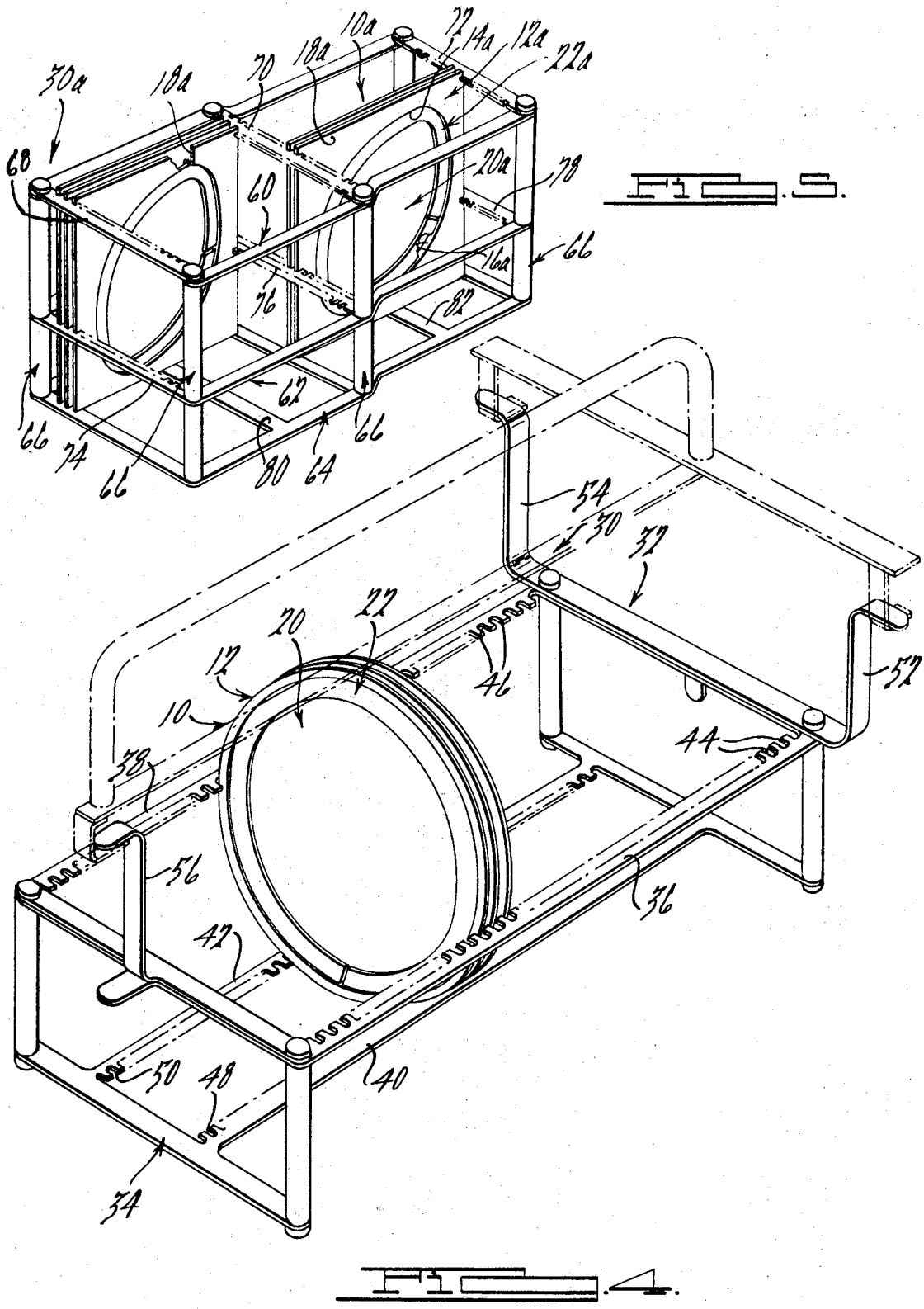

STAIN SYSTEM FOR MEMBRANE FILTERS

SUMMARY BACKGROUND OF THE INVENTION

The present invention relates to pathology specimens, such as body fluids and the like, staining apparatus, systems and processes and more specifically to apparatus, systems and processes for staining pathology specimens carried by a membrane filter.

In assisting pathologists and other medical practitioners in medical analysis and diagnosis it is often helpful to have pathology specimens stained to assist in identifying certain features or characteristics of the specimen. Pathology specimen staining techniques are well known and can be performed by hand or automatically by devices such as the staining machine shown and described in the U.S. Pat. No. to Kobernick, 3,302,607, issued Feb. 7, 1967. In the staining process the tissue samples are immersed in various baths and washes for preparation purposes and are eventually stained in a stain bath. In many cases pathology specimens such as samples are mounted to slides and the slides are carried in a basket for processing. Some pathology specimens, however, such as urine are not readily carried by slides and are deposited on membrane filters. The problem is in carrying the membrane filter through the various baths. In some cases the filter has been clipped to a slide for processing; this, however, is unsatisfactory since the filter is not securely retained thereby and can be damaged resulting in damage to the specimen. In addition the existing stain baskets are not of a design to accommodate any substantial number of slides having filters clipped thereto. In the present invention novel apparatus has been provided for processing membrane filters carrying specimens which apparatus can be used in a manual or automatic processing system. Therefore it is an object of the present invention to provide novel apparatus of the above described type. It is another object to provide novel apparatus such as a novel basket structure for carrying membrane filters held in a novel, simple two piece filter support for which the basket is specifically adapted. In addition it is another object to provide other apparatus to assist in the assembly and disassembly of the membrane filter to the filter support. It is another object to provide a basket specifically adapted as noted above and further constructed such as to be compatible for use with an automatic staining machine or with a removable handle for manual processing.

Other object, features, and advantages of the present invention will become apparent from the subsequent description and the appended claims, taken in conjunction with the accompanying drawing, in which:

FIG. 1 is an exploded pictorial view of a membrane filter with a filter support in relationship with a disassembly tool;

FIG. 2 is a pictorial view of the membrane filter and filter support of FIG. 1, as assembled together and located on the disassembly tool;

FIG. 3 is an enlarged elevational view with some parts shown in section generally along the lines 3—3 in FIG. 2 and with some parts shown broken away;

FIG. 4 is an enlarged pictorial view showing a plurality of membrane filters in assembly with filter supports which are mounted in a basket for processing; and FIG. 5 is a pictorial view showing a plurality of membrane filters in assembly with filter supports, of a modified construction, and some parts shown broken away and which are mounted in a modified basket for processing.

Looking now to the drawings, a filter support assembly 10 includes an annular support member 12 of a circular shape which has a central opening 14 defined by an annular recess 16. The support member 12 has an annular circular lip 18 which serves a purpose to be described. The recess 16 is of a depth to receive a circularly shaped membrane filter 20. A flat, split retainer ring 22 has a relaxed outer diameter larger than the diameter of recess 16 such that the split ring 22 when compressed can be inserted in the recess 16 and can expand to securely hold the filter 20.

Note that with the construction shown and described the filter 20 is securely held for substantially its entire periphery or for substantially 360°. Note also that the radial width of the recess 16 (i.e. dimension $x$) is a minimum in order that as little of the filter 20 be covered. In other words the present design provides good peripheral retention of the filter 20 while maintaining the exposed area at a maximum; in a preferred form of the invention the radial width was 0.125 inch where the diameter of the recess 16 was 1.850 inch.

The thickness of the split ring 22 is relatively small and is preferably less than the axial depth of the recess 16 such that when the split ring 22 is inserted in recess 16 with a filter 20 therein the split ring 22 will be flush with the outer surface of lip 18. The radial width $y$ of the split ring 22 is slightly greater than the width $x$ of the recess 16; this serves a purpose to be seen.

After processing the filter 20, it is desirable to remove the filter 20 from the support assembly 10. The assembly 10 can be disassembled and the filter 20 removed, without damage to the filter 20 by a separating tool 24.

The tool 24 has an enlarged base 26 with a boss 28 extending upwardly therefrom. The boss 28 is circular and of a diameter which is slightly less than the diameter of the opening 14 in support member 12. To remove the filter 20 from the support assembly 10, the assembly 10 is placed on the tool with the recess side facing up and with the opening 14 located over the boss 28. The split ring 22, having a width $y$ greater than the width $x$ of recess 16, will have an inside diameter less than the opening 14. This is provided to a preselected extent such that the split ring 22, when assembled in opening 14, will interfere with the boss 28. Thus by merely moving the support member 12 down over the boss 28 the split ring 22, by engagement with the boss 28, will be removed and the filter 20 will be deposited upon the flat upper surface of boss 28.

The filter 20 as secured to the assembly 10 can be processed in a basket 30. The basket 30 is generally rectangularly shaped and has a pair of rectangular end frames 32 and 34. A pair of upper rails 36 and 38 connect the upper ends of the end frames 32 and 34 while a pair of lower rails 40 and 42 connect the bottom of the end frames 32 and 34 at locations in from their lower ends. The rails 36 and 38 are provided with uniform grooves 44 and 46 which are in confrontation with each other. Likewise the rails 40 and 42 are provided with grooves 48 and 50 which are in confrontation with each other. Individual ones of the grooves 44, 46, 48 and 50 are in alignment for a purpose to be seen.

The upper rails 36 and 38 are spaced apart such that the spacing between associated grooves 44 and 46 is slightly greater than the outside diameter of the support member 12 as defined by the annular lip 18. The width of the grooves 44 and 46 is sufficient to receive the lip 18. The lip 18 also fits into the associated ones of the grooves 48 and 50 in more closely spaced lower rails 40 and 42. Thus the assembled support assembly 10 with filter 20 can be securely held in the basket 30 via one associated set of the grooves 44, 46, 48 and 50. The distance of teeth between grooves 44, 46, 48 and 50 is sufficient to properly space the grooves 44, 46, 48 and 50 such that a plurality of assemblies such as assembly 10 can be located in consecutive ones of the grooves 44, 46, 48 and 50 while still maintaining adequate clearance between adjacent ones of the assemblies, such as assembly 10, to permit good flow and access of the necessary bath materials to the membrane filter 20. Note that by providing the assembly 10 to be supported by a thin lip 18, which is less than the total axial thickness of the assembly 10, the number of assemblies 10 that can be carried by the basket 30 can be maximized. Note also that the basket 30 is of a generally open structure formed only of the frames and rails shown; this provides adequate support while minimizing any impedance to fluid flow.

In order to facilitate use of the basket 30 on a staining machine such as that shown in the Kobernick patent, supra, a plurality of vertical arms 52, 54 and 56 are provided. Vertical arms 52 and 54 are located at opposite ends of frame 32 while arm 56 is located in the center of the opposite frame 34. The arms 52, 54, and 56 each have tabs with the tabs for arms 52, 54 extending to opposite sides of basket 30 and the tab for arm 56 extending away from the frame 34. These tabs permit gripping for processing by a staining machine or by a handle (shown in phantom) whereby the basket 30 can be processed manually.

A modified form of the invention is shown in FIG. 5 where components similar to like components in the embodiment of FIGS. 1–4 have been given the same numeral designation with the addition of the letter postscript a.

Looking now to FIG. 5, a filter support assembly 10a includes an annular rectangularly shaped support member 12a which has a central opening 14a defined by a annular, circular recess 16a. The support member 12a has a peripheral lip 18a. Like the embodiment of FIGS. 1–4, the recess 16a is of a depth to receive a circularly shaped membrane filter 20a. A flat, split retainer ring 22a is like ring 22 and performs the same function as ring 22 and hence can be inserted in the recess 16a to securely hold the filter 20a.

Again the thickness of the split ring 22a is relatively small and is preferably less than the axial depth of the recess 16a such that when the split ring 22a is inserted in recess 16a with a filter 20a therein it will be flush with the outer surface of lip 18a. As with the embodiment of FIGS. 1–4 the axial width ($y$) of the split ring 22a is slightly greater than the width ($x$) of the recess 16a.

After processing the filter 20a, it can be removed from the support assembly 10a in the same manner as with FIGS. 1–4 by the separating tool 24.

The filter 20a as secured to the assembly 10a can be processed in a basket 30a. The basket 30a is generally rectangularly shaped and has three frame members 60, 62 and 64. The three frames 60, 62 and 64 are held together and vertically spaced by post structure 66. The frames 60 and 62 are identical and each has grooved cross rails 68, 70 and 72 and 74, 76 and 78, respectively. The cross rails 68 and 70 and 70 and 72 are provided with uniform grooves which are in confrontation with each other. Likewise the rails 76 and 76 and 76 and 78 are provided with grooves which are in confrontation with each other. Individual ones of the grooves on rails 68 and 74, 70 and 76, and 72 and 78 are in vertical alignment.

The width of these grooves is sufficient to receive the lip 18a. Thus the assembled support assembly 10a with filter 20a can be securely held in the basket 30a via one associated set of these grooves. The distance of teeth between these grooves is sufficient to properly space them such that a plurality of assemblies such as assembly 10a can be located in consecutive ones of the groove sets while still maintaining adequate clearance between adjacent ones of the assemblies, such as assembly 10a, to permit good flow and access of the necessary bath materials to the membrane filter 20a. The lower frame 64 has intermediate cross rails 80 and 82 upon which the assemblies 10a can rest for support.

As with the embodiment of FIGS. 1–4, by providing the assembly 10a to be supported by a thin lip 18a, which is less than the total axial thickness of the assembly 10a, the number of assemblies 10a, that can be carried by the basket 30a can be maximized. Note also that the basket 30a is of a generally open structure formed only of the frames and rails shown; this provides adequate support while minimizing any impedance to fluid flow.

The basket 30a can be adapted for use on staining machine such as that shown in the Kobernick patent.

Thus in the present invention a system has been shown and described whereby membrane filters can be easily handled and quickly processed. This system as shown and described includes singly and in combination a novel basket, a novel filter support assembly and novel apparatus for facilitating removal of the filter after processing and disassembly of the support assembly.

While it will be apparent that the preferred embodiments of the invention are well calculated to fulfill the objects above stated, it will be appreciated that the invention is susceptible to modification, variation and change without departing from the proper scope or fair meaning of the invention.

What is claimed is:

1. In a system for retaining tissue or the like comprising:
    a disk-like filter for carrying said tissue;
    a disk-like annular support member having a circular recessed portion for completely receiving the filter and tissue thereon;
    a relatively narrow inwardly extending flange disposed about one end of said recessed portion for seating said filter;
    a relatively narrow, interference fit, split ring element received entirely within said recess to retain the filter against said flange; and
    said element having a radial width larger than that of said flange;
    whereby said retained filter and tissue can be selectively exposed to treating fluids and whereby the portion of said retainer element extending beyond said flange provides a sufficiently firm support for removal of the tissue carrying filter, from the recessed portion, by a forcing member acting on the filter area aligned with said portion of the retainer element.

2. The apparatus of claim 1 wherein the radial width of said flange is 0.125 inch and the recess diameter is 1.850 inches.

3. The apparatus of claim 2 wherein said disk-like member includes a radially extending flange element about the outer periphery thereof.

4. The apparatus of claim 3 wherein the disk-like member is circular in peripheral configuration.

5. The apparatus of claim 3 wherein the disk-like member is rectangular in peripheral configuration.

6. The apparatus of claim 1 in combination with a forcing tool having a peripheral portion adapted to overlie said aligned filter area whereby the filter and tissue therewith may be removed from said recessed postion.

7. The apparatus of claim 1 in combination with a basket means for supporting a plurality of said disk-like members for simultaneously treating the filters therewith, said basket comprising:
an open frame means;
at least one pair of spaced upper rails and one pair of spaced lower rails supported within said frame and generally parallel to one another;
each rail including consecutive, inwardly opening slots; and
said slots being in associated alignment and of a dimension whereby each opposed pairs of slots slidingly receives a peripheral portion of, and retains in a predetermined vertical position, one of said plurality of disk-like members.

8. The apparatus of claim 7 wherein said lower rails are closer to one another than the upper rails and provide the bottom support surface for said disk-like members.

9. The apparatus of claim 7 wherein each lower rail is in vertical alignment with the corresponding upper rail and is disposed at an intermediate vertical section of said frame;

The frame is provided with at least an additional rail element at the bottom thereof; and
said disk-like members are supported on said additional rail element.

10. The apparatus of claim 7 wherein the frame is compartmented and each compartment includes said pairs of upper and lower rails to each support a plurality of said disk-like members.

11. The apparatus of claim 7 including arm elements extending from opposite ends of said frame and adapted to be associated with holder means whereby the basket may be manipulated in said system.

12. The apparatus of claim 11 wherein handle means are affixed to said arms whereby to manipulate said basket.

13. The apparatus of claim 11 including two of said arms at opposite ends of one of said end frame structures and one of said arms being generally centrally located at the other of said end frame structures.

14. The apparatus of claim 13 having a tab element extending away from said basket at the terminus of each of said arms.

* * * * *